United States Patent
Kourous-Harrigan et al.

(10) Patent No.: US 11,030,889 B2
(45) Date of Patent: Jun. 8, 2021

(54) SYSTEMS AND METHODS FOR DYNAMIC TRAFFIC LANE MANAGEMENT

(71) Applicant: Ford Global Technologies, LLC, Dearborn, MI (US)

(72) Inventors: Helen Elizabeth Kourous-Harrigan, Monroe, MI (US); Oliver Lei, Windsor (CA); Joseph C. Jira, Canton, MI (US); Frank Thomas Brown, Ferndale, MI (US); Alan Hejl, Ferndale, MI (US); Amy Robertson, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 16/533,702

(22) Filed: Aug. 6, 2019

(65) Prior Publication Data
US 2021/0043075 A1 Feb. 11, 2021

(51) Int. Cl.
*G08G 1/01* (2006.01)
*H04W 4/40* (2018.01)
*G08G 1/16* (2006.01)

(52) U.S. Cl.
CPC ......... *G08G 1/0145* (2013.01); *G08G 1/0112* (2013.01); *G08G 1/167* (2013.01); *H04W 4/40* (2018.02)

(58) Field of Classification Search
CPC .... G08G 1/0145; G08G 1/0112; G08G 1/167; H04W 4/40
USPC ....................................................... 701/117
See application file for complete search history.

(56) References Cited

U.S. PATENT DOCUMENTS

| | | | | |
|---|---|---|---|---|
| 5,289,183 A * | 2/1994 | Hassett | .................. | G01S 13/765 340/905 |
| 7,128,262 B2 * | 10/2006 | Rieder | .................. | G07B 15/063 235/384 |
| 7,324,017 B2 * | 1/2008 | Hartinger | ............... | G01C 21/26 340/928 |
| 8,587,454 B1 * | 11/2013 | Dearworth | ........... | G07B 15/063 340/928 |

(Continued)

FOREIGN PATENT DOCUMENTS

KR 20140140689 A 12/2014

OTHER PUBLICATIONS

Blythe, et al. (2004). Road User Charging in the UK. How will the technology evolve over the next 10 years to meet the future challenges of Nationwide charging schemes (14 pages).

(Continued)

*Primary Examiner* — John A Tweel, Jr.
(74) *Attorney, Agent, or Firm* — Brandon Hicks; Eversheds Sutherland (US) LLP

(57) ABSTRACT

Systems, methods, and computer-readable media are disclosed for dynamic traffic lane management. Example methods may include receiving traffic information associated with vehicles travelling on a portion of a multilane road; designating at least one lane of the multilane road as a managed lane based on the traffic information; transmitting, via a vehicle-to-everything (V2X) communications protocol, a message to the vehicles, the message indicative of the designation of the lane as the managed lane; and receiving a confirmation message from a vehicle, the confirmation message indicative of the vehicle's acceptance of travelling on the managed lane.

20 Claims, 5 Drawing Sheets

(56) References Cited

U.S. PATENT DOCUMENTS

| | | | |
|---|---|---|---|
| 10,309,789 B2* | 6/2019 | Ramasamy | G08G 1/096725 |
| 2008/0300776 A1* | 12/2008 | Petrisor | G08G 1/0112 |
| | | | 701/118 |
| 2014/0188376 A1* | 7/2014 | Gordon | G08G 1/09 |
| | | | 701/118 |
| 2016/0171787 A1 | 6/2016 | Yohalashet | |
| 2018/0033244 A1 | 2/2018 | Northrup et al. | |

OTHER PUBLICATIONS

Gkemou, M. (2017) Safe Strip Use Cases. European Union's Horizon 2020 Research and Innovation Programme. Safe Strip 1st Pan-European workshop. Thessaloniki, Greece. (12 pages).

\* cited by examiner

SYSTEMS AND METHODS FOR DYNAMIC TRAFFIC LANE MANAGEMENT

TECHNICAL FIELD

The present disclosure relates to systems and methods for traffic management, and more specifically, to systems and methods for dynamic traffic lane management.

BACKGROUND

Traffic accidents and roadway congestion represents significant challenges in present transportation systems. In some cases, toll roads can include public or private roads (e.g., a controlled-access road) for which a toll may be assessed for passage. Tolls can serve as a form of road pricing implemented to help recover the cost of road construction and maintenance. Toll roads can help vehicles having a heightened sense of urgency to arrive at a destination to pass through an area faster than travelling on non-toll roads. In other cases, high-occupancy vehicle lanes (also known as an HOV lanes, carpool lanes, diamond lanes, and/or transit lanes) can include restricted traffic lanes reserved for the use of vehicles with a driver and one or more passengers, including carpools, vanpools, and transit buses. HOV lanes can facilitate vehicles carrying more passengers pass faster than vehicles carrying a single passenger.

However, despite their use in mitigating traffic congestion and providing convenience for drivers and passengers, toll roads and HOV lanes may need to be physically built and may have corresponding physical infrastructure. For roads without the physical infrastructure to support such lanes, the lanes of the road may not be distinguishable. Further, even in the case of roads having appropriate physical infrastructure, there may be downsides. For example, toll roads may slow traffic at least by taking time from drivers to stop and pay the toll. Further, the toll roads may have toll booth operators which can have associated costs. Such costs may be up to about one-third of revenues in some cases.

Therefore, systems and methods are needed to provide enhanced and dynamic traffic lane management to improve transportation systems.

DETAILED DESCRIPTION

Overview

Figure 1:
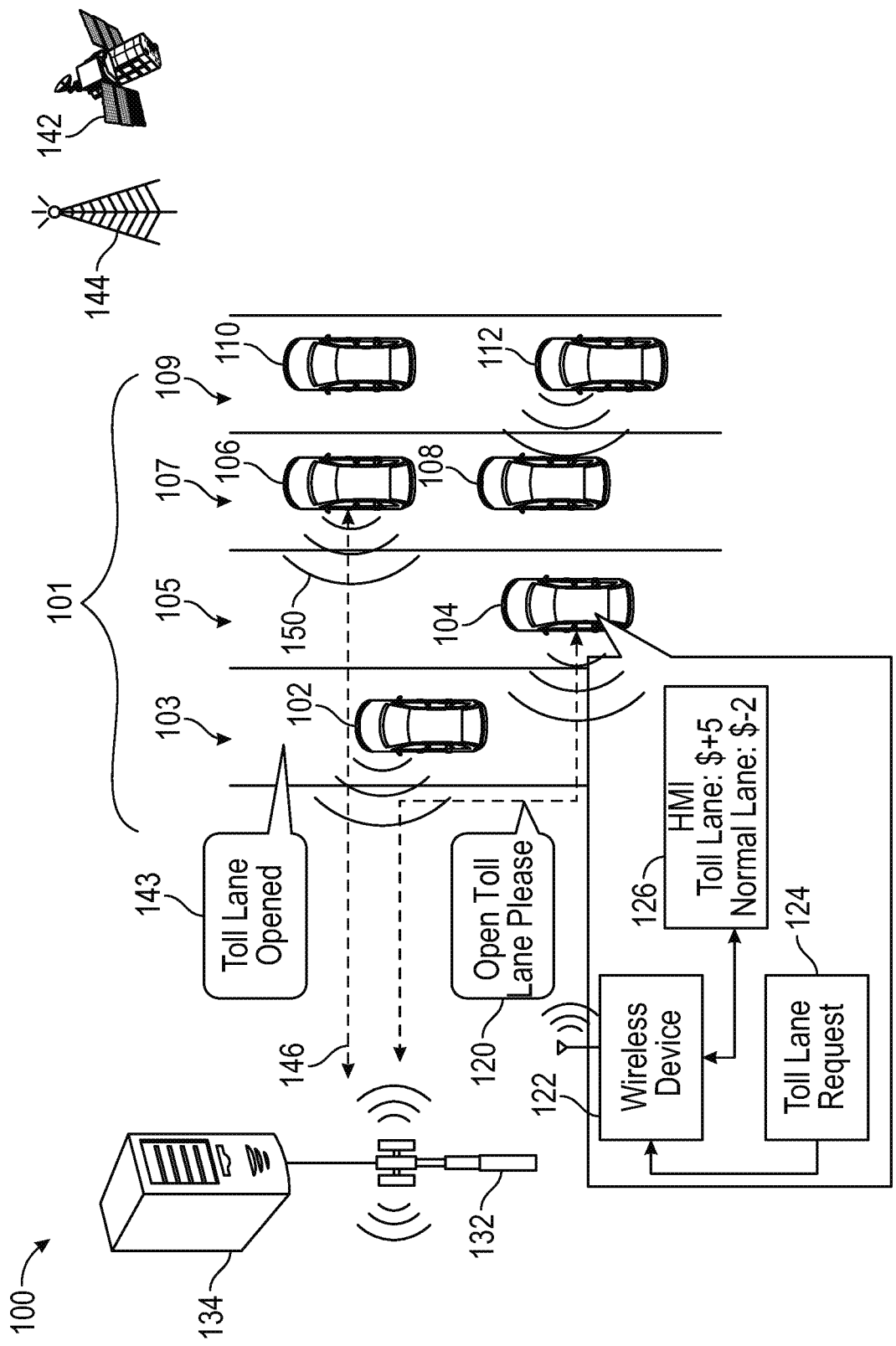
FIG. 1 shows a diagram of an example environmental context for dynamic traffic lane management, in accordance with example embodiments of the disclosure.

Embodiments of the disclosure are generally directed to a virtual managed lane system and methods that can serve to provide dynamic traffic lane management. In some examples, the virtual managed lane system can include a roadside unit, a server, and one or more vehicles capable of communicating with the roadside server and/or other vehicles. In some examples, the disclosed systems can configure the vehicles to communicate via a vehicle-to-everything (V2X) communication system with the roadside unit. In other aspects, the vehicles can include autonomous vehicles (AVs). In other aspects, the disclosed systems can configure the virtual managed lane system to not need to use physical lanes having a fixed designation as a physical toll or carpool lane. Rather, the disclosed systems can be configured to dynamically designate any given lane of a road as a managed lane (e.g., a lane that can serve as a physical toll lane, a carpool lane, and the like), as described further below.

In some examples, the disclosed systems can configure the roadside unit to receive traffic data and transmit the data to the server. If the server determines there is traffic, the disclosed systems can configure the server to send an alert to the vehicles on a portion of the road that a managed lane (e.g., a toll lane or a carpool lane) has opened. In some examples, if the server determines that the traffic is particularly heavy, the disclosed systems may configure the server to open multiple managed lanes simultaneously or in succession. In some examples, the disclosed systems can configure the roadside unit to receive requests to open a managed lane by the vehicles and/or drivers and passengers of the vehicles. The disclosed systems can configure the server to open a managed lane if a predetermined threshold amount (e.g., a user configurable amount) of requests are received. If the managed lane is a toll lane, then the disclosed systems can be configured to receive payments of the toll from the vehicles (e.g., from accounts associated with users of the vehicles or the vehicles themselves) to enter the lane. Additionally, vehicles that remain in the slower, normal lanes may receive a benefit, such as a monetary reward.

The disclosed systems can provide dynamic, managed lanes to enable vehicles of users that have a heightened need to arrive at a destination to move faster in the toll lane by making a payment. In other aspects, the disclosed systems can permit vehicles of users that have a reduced sense of urgency to arrive at a destination to take the unmanaged traffic lanes and be rewarded for taking such unmanaged lanes. In some examples, this dynamic and differential traffic control can be convenient and useful for AV fleet services. In other examples, the disclosed systems can dynamically determine the managed lanes, depending on the flow of traffic. For example, the managed lane(s) can be switched over time to mirror changing traffic flow rates. As noted, multiple managed lanes may be opened and closed to balance traffic flow.

In some examples, the disclosed systems can allow users to specify (e.g., via an application on a user's device) certain options that indicate the users' degree of urgency to get to a destination via a particular route or to indicate users' flexibility in taking alternative routes that may take additional time (e.g., for a reward). The disclosed systems can pool statistics of information about the users' needs and determine dynamic lane changes accordingly based on the specified options from the users.

Illustrative Embodiments

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used herein, a "communication system" can refer to a computer network in which vehicles and roadside units serve as communicating nodes, providing each other with information, such as safety warnings and traffic information. These components can be used in avoiding accidents and in reducing traffic congestion. The components may include dedicated short-range communications (DSRC) devices, cellular vehicle-to-everything (C-V2X) devices, vehicle-to-network (V2N) devices, or other V2X-capable devices. DSRC can refer to one-way or two-way short-range to medium-range wireless communication channels specifically designed for automotive use and a corresponding set of protocols and standards.

As used herein, "vehicle-to-everything" (V2X) communication may refer to the communication of information between a vehicle and any entity that may affect the vehicle. It is a vehicular communication system that incorporates other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). In some aspects, V2X communication technology can include wide local area network (WLAN)-based, and cellular-based communications. V2X communication can include any suitable network-based V2X communication such as vehicle-to-network (V2N) or WLAN-based V2X communication. In some examples, V2N can use long-term evolution (LTE) (and its variants) as described, for example, in 3GPP standards Release 14. Moreover, V2X functionalities can support 5G, as described in connection with various standards, such as 3GPP Release 15. In some examples, the V2N can include a PC5 side link peer-to-peer short range communication capability.

As used herein, a "basic safety message," (BSM) can refer to an electronic message in vehicle-to-vehicle (V2V) applications. The BSM may include a low latency, localized broadcast that can be used in connection with V2V safety applications. Such V2V safety applications can be built around any suitable standard, such as a society of automotive engineers (SAE) J2735 BSM standard. In some examples, the BSM may include a portion having vehicle data elements (vehicle size, position, speed, heading acceleration, brake system status, and/or the like). In some cases, the BSM can be transmitted using any suitable technique, such as DSRC, and may have a range of about 1,000 meters.

As noted, conventional toll roads and carpool lanes may need to be built physically. Unfortunately, for roads without such physical toll roads and/or carpool lanes, users of vehicles on the road may all be treated equally in terms of traffic flow. However, at times, vehicles may need to pass through a road quickly, for example, for passengers to get to a destination such as an airport at a certain time. Other vehicles may transport passengers that are not necessarily in a rush and may rather enjoy entertaining themselves during the ride, for example, by watching movies in the vehicle. The vehicles in these examples can be conventional driver-based vehicles or can be AVs, for example, AVs that are a part of a fleet service. Accordingly, conventional systems that treat users of vehicles in traffic in the same manner may not satisfy all passengers' needs and desires.

As noted, the disclosed systems can selectively open virtual managed lanes (e.g., toll lanes and/or carpool lanes) in a dynamic manner based on traffic flow. Accordingly, vehicles that have individuals in a rush to get to their respective destinations can pay a fee to use the managed lane, while vehicles that have individuals that are not in a rush to get to their respective destinations can stay in a lane having normal traffic flow. Such vehicles and/or passengers of such vehicles may be incentivized to remain in their unmanaged lanes by receiving monetary rewards and/or credits (e.g., discounts or points towards AV ride sharing services).

FIG. 1 shows a diagram of an environmental context for dynamic traffic lane management, in accordance with example embodiments of the disclosure. FIG. 1 represents an environmental context 100 that includes vehicles (e.g., vehicles 102, 104, 106, 108, 110, and/or 112) traveling on a road 101, along with infrastructural components such as roadside unit 132. Further, the vehicles may include vehicle antennas. The roadside unit 132 can include memory and at least one processor. The vehicle antennas may communicate messages (e.g., V2X messages) to and from between vehicles in addition to the antenna of the roadside unit 132.

In some examples, the road 101 may have multiple lanes (e.g., lanes 103, 105, 107, and 109), but may not have a physical carpool lane or a toll lane. The vehicles (e.g., vehicles 102, 104, 106, 108, 110, and 112) can include AVs, and may have wireless devices capable of V2X communications to roadside unit 132 or a communications network (e.g., via cell tower 144). In some examples, the disclosed systems can configure the vehicles to periodically send messages (e.g., BSMs), along with the vehicles' location information and velocities to the roadside unit 132 and/or to a server 134.

In some examples, the disclosed systems can configure the roadside unit 132 or another wireless network (e.g., cellular network) to receive information from the vehicles, determine a vehicle traffic situation on the road 101, and transmit the information to the server 134. In an example, if the server 134 senses that the traffic density on the road 101 is above a predetermined traffic threshold and/or that the average vehicle speed is below a predetermined traffic speed threshold, the disclosed systems can configure the server 134 to broadcast messages to the vehicles on the road 101 in the affected area. In particular, the disclosed systems can configure the server 134 to broadcast messages to indicate that a managed lane (e.g., a toll lane and/or a carpool lane) has been opened in one of the lanes of the road 101 (e.g., one of lanes 103, 105, 107, and/or 109).

In some examples, the disclosed systems can designate the managed lane as a toll lane (e.g., designate managed lane 103 as a toll lane). Alternatively, vehicles (e.g., vehicle 104) can transmit a toll lane request 124 via the wireless device 122. Once the disclosed systems designate a lane as a managed lane, an infrastructural element such as roadside unit 132 can transmit a V2X message (e.g., message 143) that the toll lane (e.g., managed lane 103) has opened. In other examples, a given vehicle (e.g., vehicle 102) can transmit the V2X message that the toll lane (e.g., managed lane 103) has opened. Accordingly, vehicles in other lanes than the managed lane can move to the toll lane.

In some examples, the disclosed systems can be configured to communicate with the wireless device 122 associated with a user of the vehicle (e.g., a mobile device of the user, a vehicle-based device, etc.) in order to cause the wireless device 122 to transmit payment (e.g., to the roadside unit 132). In one example, a user of the vehicle can agree to make the payment (e.g., via a confirmation sent by a user device), and the server 134 can process the payment from an account associated with the vehicle or a user of the vehicle, and notify the user after the payment is completed. In some examples, the payment may also be made automatically if the vehicle stays in the managed toll lane. In other examples, the disclosed systems can configure a vehicle's human-machine interface (HMI) 126 to show the designated managed lane, indicate that the vehicle is in toll lane, and display the payment and processing thereof. If the vehicle does not make the payment for a certain time period or distance in the toll lane, the server may automatically charge the vehicle's account and notify the user.

As noted, if the customer agrees to make payment (e.g., via real-time approval or via a customer preauthorization), the server 134 can charge the vehicle. In some examples, the disclosed systems may charge different amount of fee based on the location on the road and/or based on an amount of distance that the vehicle takes to switch to the managed lane) where a given vehicle changes to the opened management lane. For example, vehicle 104 may change relatively quickly to the opened lane 103, while vehicle 110 changed relatively slowly (e.g., about 1 mile late) to the opened lane 103. Accordingly, vehicle 110 may be charged less. In other cases, the disclosed systems can determine the fee amount based on the vehicle lane location. For example, a vehicle (e.g., vehicle 104) that is in a lane (e.g., lane 105) that is closer to the opened managed lane (e.g., lane 103) can be charged more than a vehicle (e.g., vehicle 110) that is in a lane (e.g., lane 109) that requires more lane changes to arrive at the opened managed lane. The disclosed systems can dynamically update the differential pricing to optimize the flow of traffic and minimize delays. Further, in some examples, the disclosed systems can cause customers associated with vehicles in the unmanaged lanes (e.g., non-toll or non-carpool lanes such as lanes 105, 107, and/or 109) to obtain a discount, a reward, and/or to earn points, for example, in order to enforce a traffic fairness or to further control the flow of traffic.

In some examples, the disclosed systems can permit users and/or the vehicles (e.g., vehicle 104) to request (e.g., via a request message 120) the server 134 to open a toll lane or a carpool lane. For example, the disclosed systems can configure interfaces in the displays of the vehicles and/or applications associated with the vehicles on user devices to allow the users to submit a toll-lane request to the local network. In some examples, if the server 134 receives a threshold amount of requests, the server 134 can open a managed lane such as a toll lane or carpool lane.

The vehicles (e.g., vehicles 102, 104, 106, 108, 110, and/or 112) may include any suitable vehicle such as a motorcycle, car, truck, recreational vehicle, etc., and may be equipped with suitable hardware and software that enables it to communicate over a network, such as a local area network (LAN). As noted, the vehicles may include an AV as shown and described in connection with FIG. 4, below.

In another embodiment, the vehicles may include a variety of sensors that may aid the disclosed systems traffic management and lane determination based on location. The sensors may include radio detection and ranging (RADAR), light detection and ranging (LIDAR), cameras, magnetometers, ultrasound, barometers, and the like (to be described below). In one embodiment, the sensors and other devices of the vehicles may communicate over one or more network connections. Examples of suitable network connections include a controller area network (CAN), a media-oriented system transfer (MOST), a local interconnection network (LIN), a cellular network, a Wi-fi network, and other appropriate connections such as those that conform with known standards and specifications (e.g., one or more Institute of Electrical and Electronics Engineers (IEEE) standards, and the like).

In some examples, the vehicles may have on-board units (not shown) may include microcontrollers and devices that can communicate with each other in applications without a host computer. The on-board unit may use a message-based protocol to perform internal communications. Further, the on-board unit can cause a transceiver to send and receive messages (for example, V2X messages) to and from infrastructural components such as the roadside unit 132 and to other vehicles' on-board units.

In some examples, the vehicle can have antennas and may include any suitable communications antenna. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the vehicles and from the roadside unit 132.

Further, various devices of the vehicles and/or the infrastructural components such as roadside unit 132 may include any suitable radio and/or transceiver for transmitting and/or receiving radio frequency (RF) signals in the bandwidth and/or channels corresponding to the communications protocols utilized by any of the vehicle devices to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards.

Typically, when an example vehicle 102 establishes communication with another vehicle 104 and/or establishes communication with an infrastructural component such as roadside unit 132, the vehicle 102 may communicate (e.g., via a V2X communication protocol) by sending data frames (e.g. a data frame which can comprise various fields such as a frame control field, a duration field, an address field, a data field, and a checksum field). The data frames may be preceded by one or more preambles that may be part of one or more headers. These preambles may be used to allow the user device to detect a new incoming data frame from the vehicle device. A preamble may be a signal used in network communications to synchronize transmission timing between two or more devices (e.g., between the vehicle 102 device and the roadside unit 132).

In another aspect, the environmental context 100 may include one or more satellites 142 and one or more cellular towers 144. As noted, the vehicles may have transceivers, which in turn may include one or more location receivers (e.g., global positioning system (GPS) receivers) that may receive location signals (e.g., GPS signals) from one or more satellites 142. In another embodiment, a receiver may refer to a device that can receive information from satellites (e.g., satellites 142) and calculate the vehicles' geographical position.

Figure 2:
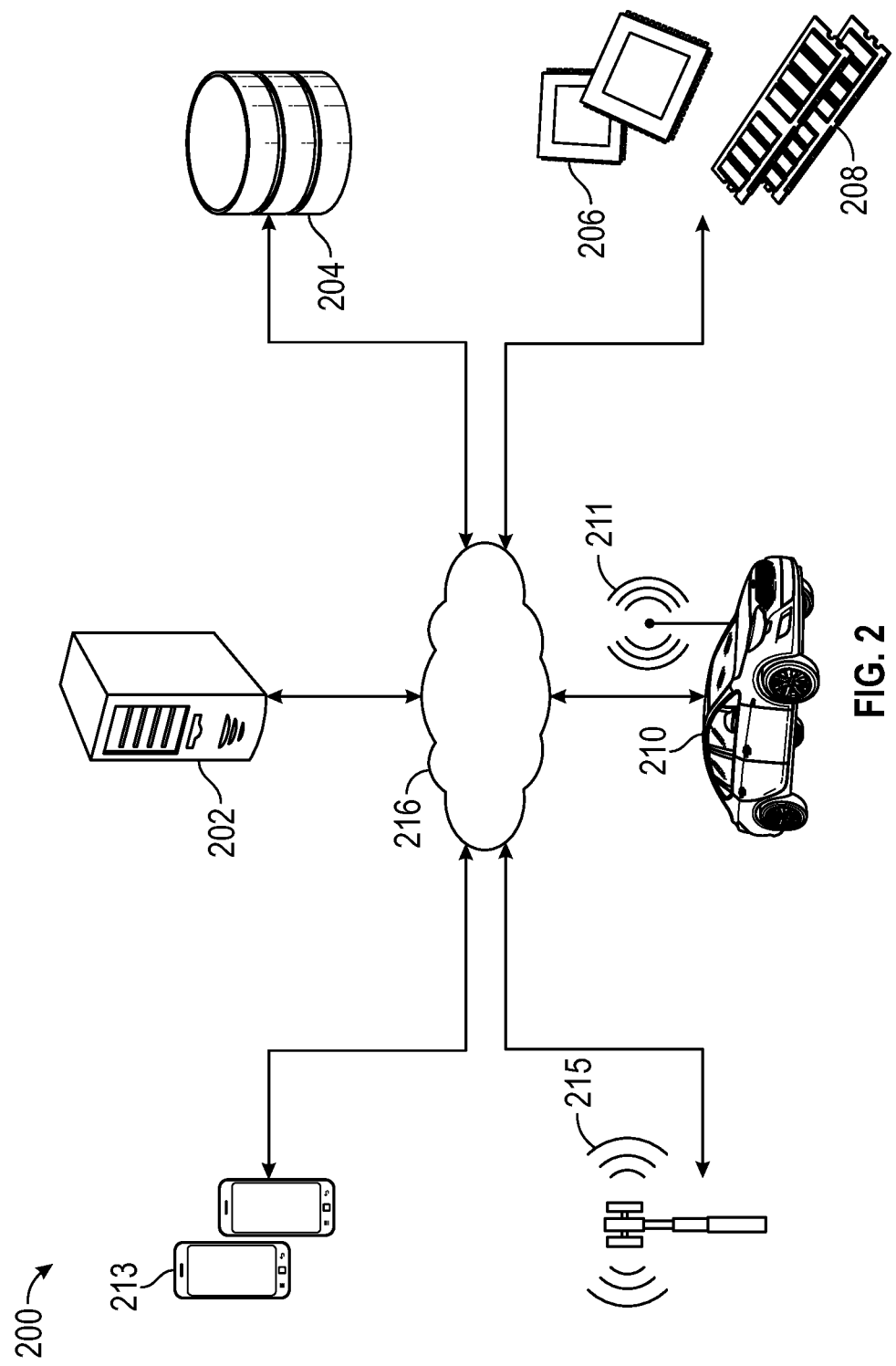
FIG. 2 shows a diagram of example components that may be used for dynamic traffic lane management, in accordance with example embodiments of the disclosure.

FIG. 2 shows a diagram of example components that may be used for dynamic traffic lane management, in accordance with example embodiments of the disclosure. In particular, diagram 200 shows computational resources including an exemplary server 202, a database 204, processor(s) 206, memory 208, user devices 213, and infrastructural element 215 that may include a roadside unit. Diagram 200 further shows an example vehicle 210 that may communicate using antennas 211. In various embodiments, the various components of diagram 200 may communicate over a network 216.

In some examples, the infrastructural component 215 may include road and highway networks, including structures (bridges, tunnels, culverts, retaining walls), signage and markings, electrical systems (street lighting and traffic lights), and/or the like. As noted, the infrastructural component 215 can include a roadside unit, and the roadside unit can communicate messages with the vehicles such as vehicle 210.

In another embodiment, the vehicles 210 may send and receive wireless signals using antenna 211. The wireless signal may be sent to other vehicles in proximity to the transmitting vehicle, or to infrastructural component 215 including the roadside unit that can be part of the transportation network. A wireless signal may additionally be sent to a user device 213, for example, to inform the user regarding dynamic traffic lane designations, payment requests, payment authorizations, and the like. For example, the vehicles may transmit such a wireless signal to the user device 213 such as a mobile phone to notify the user that the vehicle 210 is one lane away from a designated managed lane serving as a toll lane, confirm a user's desire to switch lanes, and confirm payment to a server of the disclosed systems to making a lane change to the managed lane.

The vehicles 210 and/or the user devices 213 may be configured to communicate with the one or more devices of the vehicle using a network 216, wirelessly or wired. For example, the vehicle 210 and the user devices 213 may synchronize their operations via an application running on the user device 213. The network 216 may include, but not limited to, any one of a combination of different types of suitable communications networks such as, for example, broadcasting networks, public networks (for example, the Internet), private networks, wireless networks, cellular networks, or any other suitable private and/or public networks.

Diagram 200 further shows an example server 202 that may be in communication with the various other components (for example, the database 204, the processor(s) 206, the memory 208, and/or the vehicles 210) over the network 216. In an embodiment, the server 202 may include a cloud-based server that may serve to store and transmit information (for example, payment information, traffic lane requests, historical information regarding vehicle lane changes and/or locations, and/or the like). Some or all of the individual components may be optional and/or different in various embodiments.

Diagram 200 further shows an example database 204. In some examples, the disclosed systems may obtain and analyze map information associated with an environment of the vehicles, previous vehicle locations in a given environment, infrastructural updates regarding the transportation network (for example, construction activity, road closures, etc.), and/or the like. This information can be used by the server 202 and/or the infrastructural element 215 to determine a traffic condition associated with a particular area. The database 204 may be controlled by any suitable system, including a database management systems (DBMS), discussed further in connection with FIG. 5, below. The DBMS may use any of a variety of database models (for example, relational model, object model, etc.) and may support any of a variety of query languages to obtain information from database 204. In some examples, the database 204 may include a cloud-based database or a vehicle-based database.

Processor(s) 206 may include application processors, various coprocessors, and other dedicated processors for performing dynamic traffic lane management. Processor(s) 206 may be communicably coupled with memory 208 and configured to run the operating system, user interfaces, sensors, navigation system, communication system, image processing systems, and/or other components. In some embodiments, processor(s) 206 may include multiple dedicated or shared processors configured to perform signal processing, analyze traffic conditions in a given area, implement/manage real-time radio transmission operations of the vehicle 210, send and receive messages in accordance with a V2X protocol to and from vehicles, collect and process payment information, and the like. The volatile and non-volatile memories found in various embodiments may include storage media for storing information such as processor-readable instructions, data structures, program modules, or other data. Some examples of information that may be stored include basic input/output systems (BIOS), operating systems, and applications.

Figure 3:
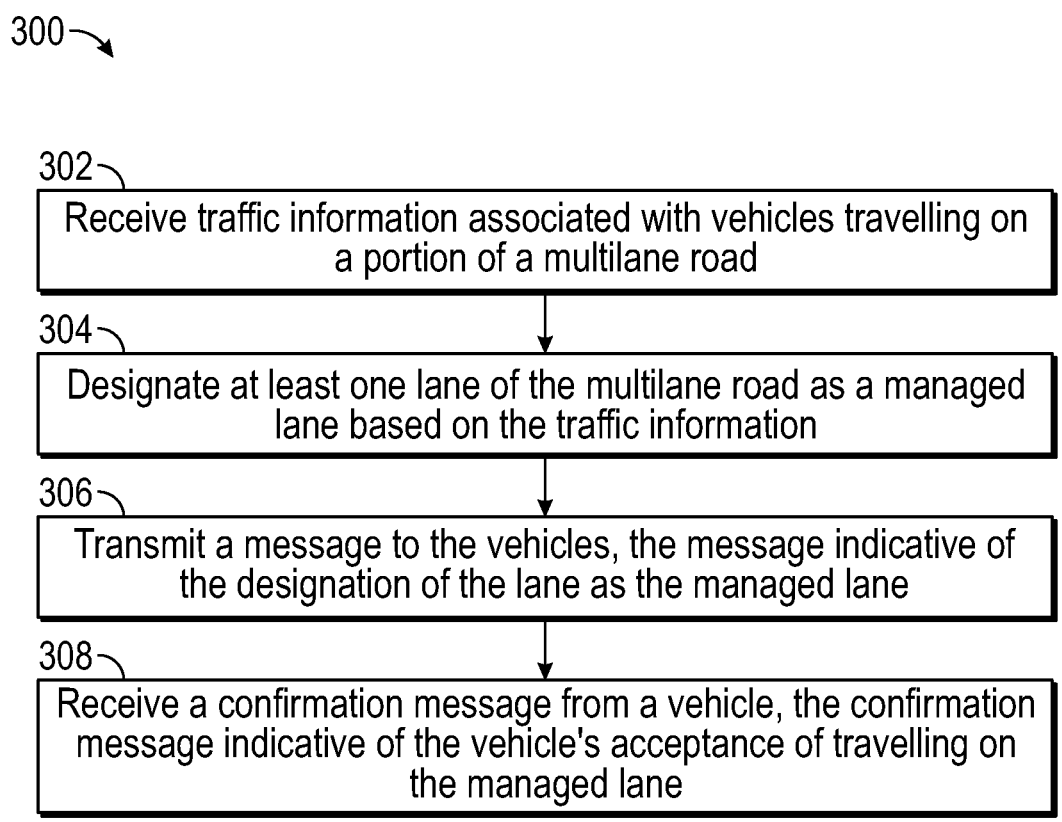
FIG. 3 shows example process flows describing a method of dynamic traffic lane management, in accordance with example embodiments of the disclosure.

FIG. 3 shows example process flows describing a method of providing dynamic traffic lane management, in accordance with example embodiments of the disclosure. At block 302, the method can include receiving traffic information associated with vehicles travelling on a portion of a multilane road. In some examples, receiving the traffic information can further include the disclosed systems receiving request messages from the vehicles for the device to designate the lane of the multilane road as the managed lane. Accordingly, the disclosed systems can determine that a threshold number of the request messages are received, and determine to designate the lane as the managed lane based on the received threshold number of request messages and traffic information associated with the portion of the multilane road.

At block 304, the method can include determining to designate at least one lane of the multilane road as a managed lane based on the traffic information. In some examples, based on the level of traffic, the disclosed systems can designate multiple lanes as managed lanes. Further, the disclosed systems can change the lane that is designated as the managed lane over time, based on changes in the traffic information.

At block 306, the method can include transmitting a message to the vehicles, the message indicative of the designation of the lane as the managed lane. The disclosed systems can further transmit the messages using a V2X communications protocol or any other suitable protocol.

At block 308, the method can include receiving a confirmation message from a vehicle, the confirmation message indicative of the vehicle's acceptance of travelling on the managed lane. Further, the disclosed systems can be configured to receive a payment from an account associated with the vehicle based on the vehicle's acceptance of travelling on the managed lane. Alternatively, the disclosed systems can be configured to a rejection message from a vehicle, the rejection message indicative of the vehicle's non-acceptance of travelling on the managed lane. Accordingly, the disclosed systems can be configured to dispose a monetary reward or a credit to an account associated with the vehicle based on the vehicle's non-acceptance of travelling on the managed lane.

In some examples, (a) an amount of a payment from an account associated with the vehicle based on the vehicle's acceptance of travelling on the managed lane or (b) an amount of a monetary reward or a credit to the account based on the vehicle's non-acceptance of travelling on the managed lane can be determined based on the traffic information. Further, the amount of payment or the amount of the monetary reward or the credit can be based on a number of lane changes that the vehicle makes to travel on the managed lane.

Figure 4:
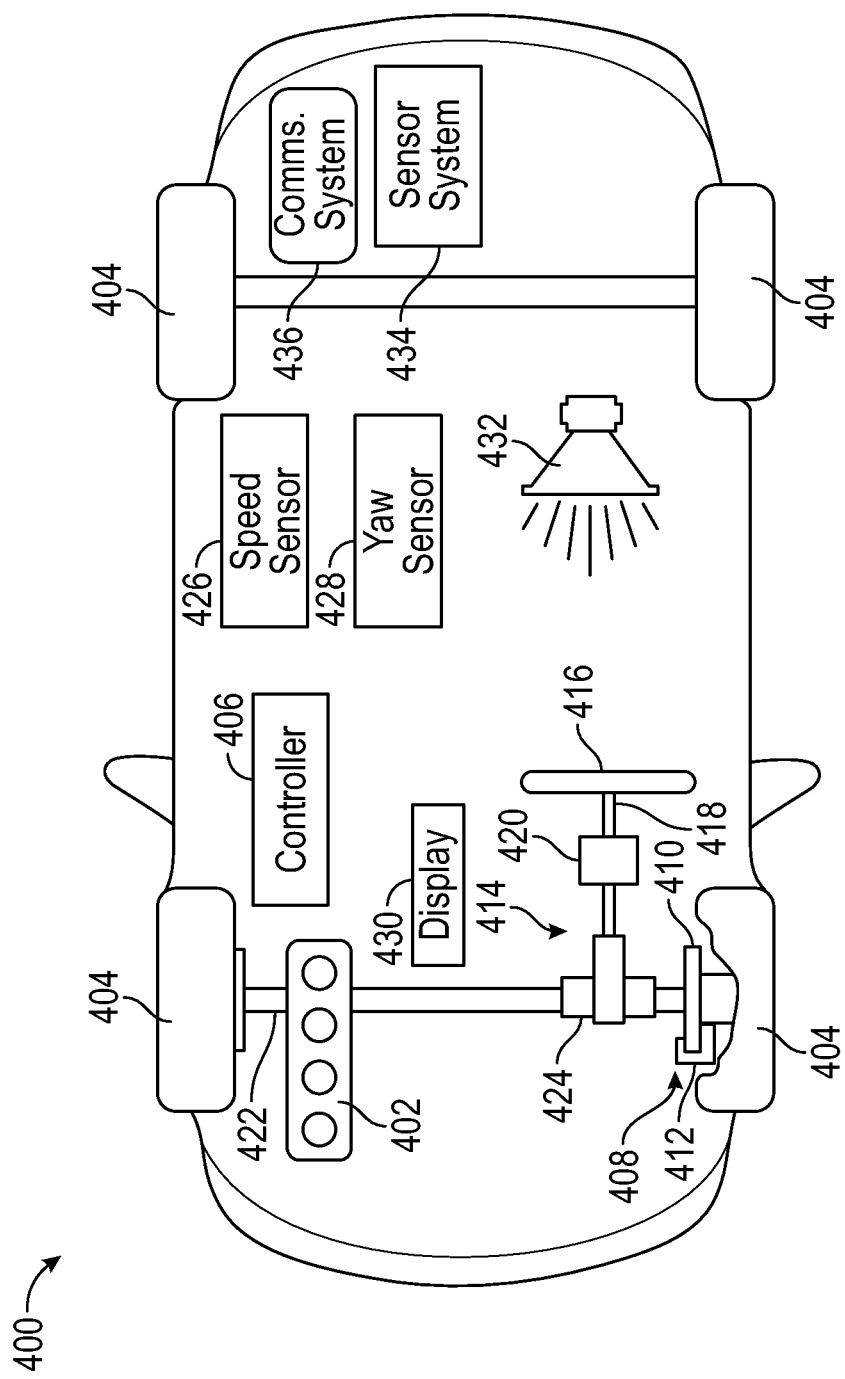
FIG. 4 is a schematic illustration of an example autonomous vehicle (AV) that can be used in dynamic traffic lane management contexts using the disclosed systems and methods, in accordance with one or more embodiments of the disclosure.

FIG. 4 is a schematic illustration of an example autonomous vehicle, in accordance with one or more embodiments of the disclosure. As noted, the vehicle (for example, any of vehicles 102, 104, 106, 108, 110, and/or 112 shown and described in connection with FIG. 1, above), may include an AV. Referring to FIG. 4, an example vehicle 400 may include a power plant 402 (such as a combustion engine and/or an electric motor) that provides torque to driven wheels 404 that propel the vehicle forward or backward.

Autonomous vehicle operation, including propulsion, steering, braking, navigation, and the like, may be controlled autonomously by a vehicle controller 406. For example, the vehicle controller 406 may be configured to receive feedback from one or more sensors (for example, sensor system 434, etc.) and other vehicle components to determine road conditions, vehicle positioning, and so forth. The vehicle controller 406 may also ingest data from various sensors such as speed monitor and yaw sensor, as well as the tires, brakes, motor, and other vehicle components. The vehicle controller 406 may use the feedback and route/map data of the route to determine actions to be taken by the autonomous vehicle, which may include operations related to the engine, steering, braking, and so forth. Control of the various vehicle systems may be implemented using any suitable mechanical means, such as servo motors, robotic arms (for example, to control steering wheel operation, acceleration pedal, brake pedal, etc.), and so forth. The controller 406 may be configured to interact with the user by communicating with the user's user device.

The vehicle controller 406 may include one or more computer processors coupled to at least one memory. The vehicle 400 may include a braking system 408 having disks 410 and calipers 412. The vehicle 400 may include a steering system 414. The steering system 414 may include a steering wheel 416, a steering shaft 418 interconnecting the steering wheel to a steering rack 420 (or steering box). The front and/or rear wheels 404 may be connected to the steering rack 420 via axle 422. A steering sensor 424 may be disposed proximate the steering shaft 418 to measure a steering angle. The vehicle 400 also includes a speed sensor 426 that may be disposed at the wheels 404 or in the transmission. The speed sensor 426 is configured to output a signal to the controller 406 indicating the speed of the vehicle. A yaw sensor 428 is in communication with the controller 406 and is configured to output a signal indicating the yaw of the vehicle 400.

The vehicle 400 includes a cabin having a display 430 in electronic communication with the controller 406. The display 430 may be a touchscreen that displays information to the passengers of the vehicle and/or functions as an input. A person having ordinary skill in the art will appreciate that many different display and input devices are available and that the present disclosure is not limited to any particular display. An audio system 432 may be disposed within the cabin and may include one or more speakers for providing information to users that pick up items. The audio system 432 may also include a microphone for receiving voice inputs or detecting sounds at the residence (for example, animal sounds). The vehicle may include a communications system 436 that is configured to send and/or receive wireless communications via one or more networks. The communications system 436 may be configured for communication with devices in the car or outside the car, such as a user's device, the delivery vehicles, etc.

The vehicle 400 may also include a sensor system for sensing areas external to the vehicle. The sensor system may include a plurality of different types of sensors and devices such as cameras, ultrasonic sensors, RADAR, LIDAR, and/or combinations thereof. The sensor system may be in electronic communication with the controller 406 for controlling the functions of various components. The controller may communicate via a serial bus or via dedicated electrical conduits. The controller generally includes any number of microprocessors, ASICs, ICs, memory (for example, FLASH, ROM, RAM, EPROM and/or EEPROM) and software code to co-act with one another to perform a series of operations. The controller also includes predetermined data, or "look up tables" that are based on calculations and test data and are stored within the memory. The controller may communicate with other vehicle systems and controllers over one or more wired or wireless vehicle connections using common bus protocols (for example, CAN and LIN). Used herein, a reference to "a controller" refers to one or more controllers and/or computer processors. The controller 406 may receive signals from the sensor system 434 and may include memory containing machine-readable instructions for processing the data from the sensor system. The controller 406 may be programmed to output instructions to at least the display 430, the audio system 432, the steering system 414, the braking system 408, and/or the power plant 402 to autonomously operate the vehicle 400.

Figure 5:
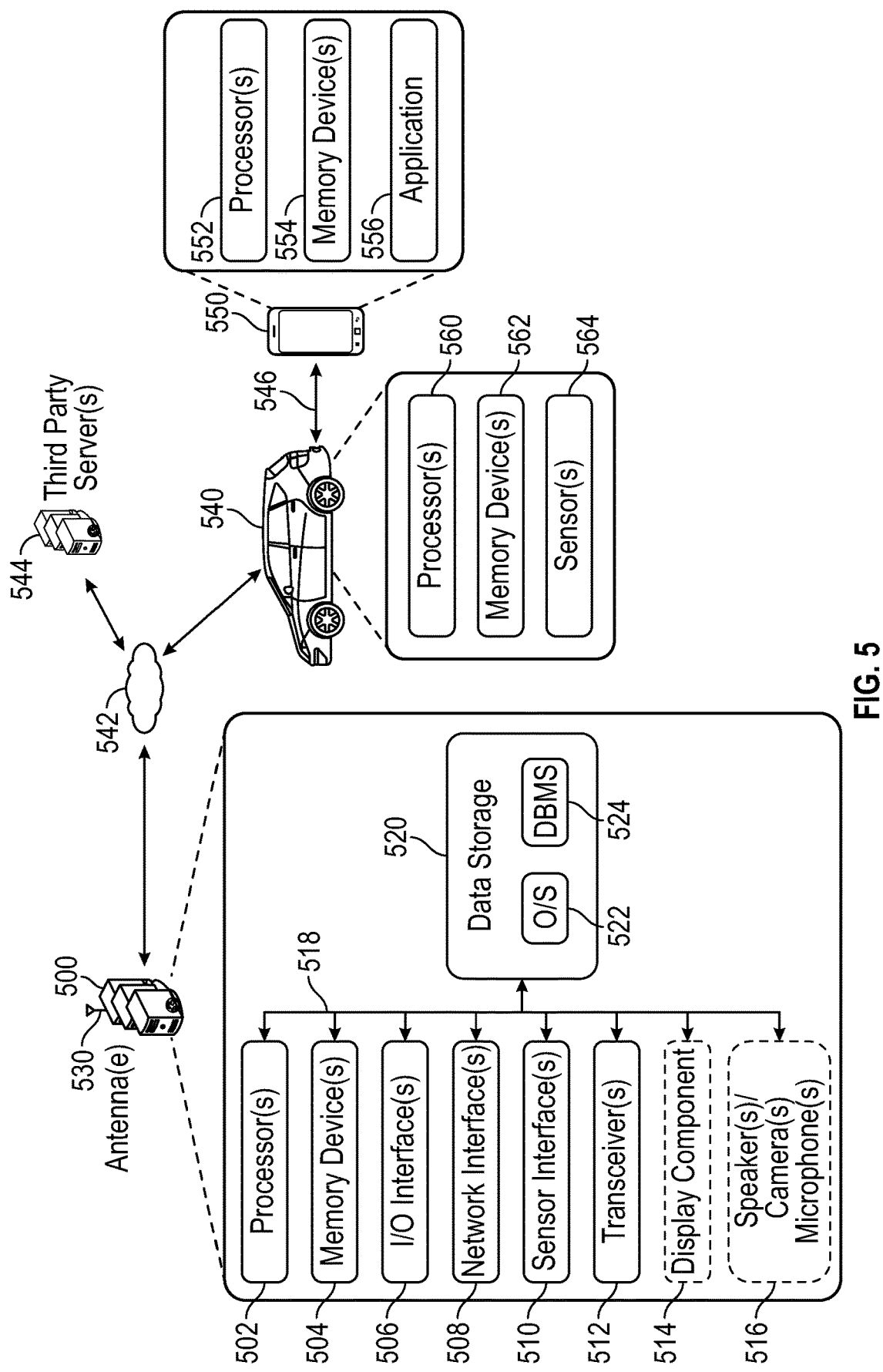
FIG. 5 is a schematic illustration of an example server architecture for one or more servers that can be used for dynamic traffic lane management, in accordance with one or more embodiments of the disclosure.

FIG. 5 is a schematic illustration of an example server architecture for one or more server(s) 500 in accordance with one or more embodiments of the disclosure. The server 500 illustrated in the example of FIG. 5 may correspond to a server that may be used by a roadside server and/or vehicle (for example, roadside server 134 and/or any of vehicles 102, 104, 106, 108, 110, and/or 112 as shown and described in connection with FIG. 1, above) on a network associated with the vehicle or a user device. In an embodiment, the server 500 may include a cloud-based server that may serve to store and transmit information (for example, messages between the roadside unit and the vehicles or between vehicles, etc. for dynamic traffic lane management, and the like). Some or all of the individual components may be optional and/or different in various embodiments. In some embodiments, at least one of the servers described FIG. 5 may be located at an autonomous vehicle.

The server 500 may be in communication with an AV 540, and one or more user devices 550. The AV 540 may be in communication 546 with the one or more user devices 550. Further, the server 500, the AV 540, and/or the user devices 550 may be configured to communicate via one or more networks 542. The AV 540 may additionally be in wireless communication over one or more network(s) 542 with the user devices 550 via a connection protocol such as Bluetooth or NFC. Such network(s) 542 may include, but are not limited to, any one or more different types of communications networks such as, for example, cable networks, public networks (for example, the Internet), private networks (for example, frame-relay networks), wireless networks, cellular networks, telephone networks (for example, a public switched telephone network), or any other suitable private or public packet-switched or circuit-switched networks. Further, such network(s) may have any suitable communication range associated therewith. In addition, such network(s) may include communication links and associated networking devices (for example, link-layer switches, routers, etc.) for transmitting network traffic over any suitable type of medium including, but not limited to, coaxial cable, twisted-pair wire (for example, twisted-pair copper wire), optical fiber, a HFC medium, a microwave medium, a radio frequency communication medium, a satellite communication medium, or any combination thereof.

In an illustrative configuration, the server 500 may include one or more processors 502, one or more memory devices 504 (also referred to herein as memory 504), one or more input/output (I/O) interface(s) 506, one or more network interface(s) 508, one or more sensor(s) or sensor interface(s) 510, one or more transceiver(s) 512, one or more optional display components 514, one or more optional speakers(s)/camera(s)/microphone(s) 516, and data storage 520. The server 500 may further include one or more bus(es) 518 that functionally couple various components of the server 500. The server 500 may further include one or more antenna(e) 530 that may include, without limitation, a cellular antenna for transmitting or receiving signals to/from a cellular network infrastructure, a GNSS antenna for receiving GNSS signals from a GNSS satellite, a Bluetooth antenna for transmitting or receiving Bluetooth signals, a NFC antenna for transmitting or receiving NFC signals, and so forth. These various components will be described in more detail hereinafter.

The bus(es) 518 may include at least one of a system bus, a memory bus, an address bus, or a message bus, and may permit the exchange of information (for example, data (including computer-executable code), signaling, etc.) between various components of the server 500. The bus(es) 518 may include, without limitation, a memory bus or a memory controller, a peripheral bus, an accelerated graphics port, and so forth. The bus(es) 518 may be associated with any suitable bus architecture.

The memory 504 of the server 500 may include volatile memory (memory that maintains its state when supplied with power) such as RAM and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

The data storage 520 may include removable storage and/or non-removable storage including, but not limited to, magnetic storage, optical disk storage, and/or tape storage. The data storage 520 may provide non-volatile storage of computer-executable instructions and other data.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to the memory 504 for use by the processor(s) 502 during the execution of the computer-executable instructions. More specifically, the data storage 520 may store one or more operating systems (O/S) 522; one or more database management systems (DBMS) 524; and one or more program module(s), applications, engines, computer-executable code, scripts, or the like. Some or all of these component(s) may be sub-component(s). Any of the components depicted as being stored in the data storage 520 may include any combination of software, firmware, and/or hardware. The software and/or firmware may include computer-executable code, instructions, or the like that may be loaded into the memory 504 for execution by one or more of the processor(s) 502. Any of the components depicted as being stored in the data storage 520 may support functionality described in reference to corresponding components named earlier in this disclosure.

The processor(s) 502 may be configured to access the memory 504 and execute the computer-executable instructions loaded therein. For example, the processor(s) 502 may be configured to execute the computer-executable instructions of the various program module(s), applications, engines, or the like of the server 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit.

Referring now to other illustrative components depicted as being stored in the data storage 520, the 0/S 522 may be loaded from the data storage 520 into the memory 504 and may provide an interface between other application software executing on the server 500 and the hardware resources of the server 500.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (for example, relational model, object model, etc.) and may support any of a variety of query languages.

Referring now to other illustrative components of the server 500, the input/output (I/O) interface(s) 506 may facilitate the receipt of input information by the server 500 from one or more I/O devices as well as the output of information from the server 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 506 may also include a connection to one or more of the antenna(e) 530 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The server 500 may further include one or more network interface(s) 508 via which the server 500 may communicate with any of a variety of other systems, platforms, networks, devices, and so forth. The network interface(s) 508 may enable communication, for example, with one or more wireless routers, one or more host servers, one or more web servers, and the like via one or more networks.

The sensor(s)/sensor interface(s) 510 may include or may be capable of interfacing with any suitable type of sensing device such as, for example, inertial sensors, force sensors, thermal sensors, photocells, and so forth.

The display component(s) 514 may include one or more display layers, such as LED or LCD layers, touch screen layers, protective layers, and/or other layers. The optional camera(s) of the speakers(s)/camera(s)/microphone(s) 516 may be any device configured to capture ambient light or images. The optional microphone(s) of the speakers(s)/camera(s)/microphone(s) 516 may be any device configured to receive analog sound input or voice data. The microphone(s) of the speakers(s)/camera(s)/microphone(s) 516 may include microphones used to capture sound.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module.

It should further be appreciated that the server 500 may include alternate and/or additional hardware, software, or firmware components beyond those described or depicted without departing from the scope of the disclosure.

The user device 550 may include one or more computer processor(s) 552, one or more memory devices 554, and one or more applications, such as a vehicle application 556. Other embodiments may include different components.

The processor(s) 552 may be configured to access the memory 554 and execute the computer-executable instructions loaded therein. For example, the processor(s) 552 may be configured to execute the computer-executable instructions of the various program module(s), applications, engines, or the like of the device to cause or facilitate various operations to be performed in accordance with one or more embodiments of the disclosure. The processor(s) 552 may include any suitable processing unit capable of accepting data as input, processing the input data in accordance with stored computer-executable instructions, and generating output data. The processor(s) 552 may include any type of suitable processing unit.

The memory 554 may include volatile memory (memory that maintains its state when supplied with power). Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

Referring now to functionality supported by the user device 550, the AV application 556 may be a mobile application executable by the processor 552 that can be used to present options and/or receive user inputs of information related to the disclosed embodiments. In addition, the user device 550 may communicate with the AV 540 via the network 542 and/or a direct connect, which may be a wireless or wired connection. The user device 550 may include a camera, scanner, bio reader or the like to capture biometric data of a user, perform certain processing steps on the biometric data, such as extracting features from captured biometric data, and then communicate those extracted features to one or more remote servers, such as one or more of cloud-based servers.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module.

The autonomous vehicle 540 may include one or more computer processor(s) 560, one or more memory devices 562, one or more sensors 564, and one or more applications, such as an autonomous driving application. Other embodiments may include different components. A combination or sub combination of these components may be integral to the controller 406 in FIG. 4.

The processor(s) 560 may be configured to access the memory 562 and execute the computer-executable instructions loaded therein. For example, the processor(s) 560 may be configured to execute the computer-executable instructions of the various program module(s), applications, engines, or the like of the device to cause or facilitate various operations to be performed in accordance with one or more embodiments of the disclosure. The processor(s) 560 may include any suitable processing unit capable of accepting data as input, processing the input data in accordance with stored computer-executable instructions, and generating output data. The processor(s) 560 may include any type of suitable processing unit.

The memory 562 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

It should further be appreciated that the server 500 may include alternate and/or additional hardware, software, or firmware components beyond those described or depicted without departing from the scope of the disclosure.

It should further be appreciated that the server 500 may include alternate and/or additional hardware, software, or firmware components beyond those described or depicted without departing from the scope of the disclosure.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A device, comprising:
   at least one memory device that stores computer-executable instructions; and
   at least one processor configured to access the at least one memory device, wherein the at least one processor is configured to execute the computer-executable instructions to:
      receive traffic information associated with vehicles travelling on a portion of a multilane road;
      designate at least one lane of the multilane road as a managed lane based on the traffic information;
      transmit a message to the vehicles, the message indicative of the designation of the lane as the managed lane; and
      receive a confirmation message from a vehicle, the confirmation message indicative of the vehicle's acceptance of travelling on the managed lane.

2. The device of claim 1, wherein receiving the traffic information further comprises receiving request messages from the vehicles for the device to designate the lane of the multilane road as the managed lane, and the processor is further configured to execute the computer-executable instructions to:
   determine that a threshold number of the request messages are received; and
   determine to designate the lane as the managed lane based on the received threshold number of request messages and the traffic information.

3. The device of claim 1, wherein the computer-executable instructions to cause to transmit a message further comprise computer-executable instructions to cause to transmit the messages using a vehicle-to-everything (V2X) communications protocol.

4. The device of claim 1, wherein the processor is further configured to execute the computer-executable instructions to receive a payment from an account associated with the vehicle based on the vehicle's acceptance of travelling on the managed lane.

5. The device of claim 1, wherein the processor is further configured to execute the computer-executable instructions to receive a rejection message from a vehicle, the rejection message indicative of the vehicle's non-acceptance of travelling on the managed lane.

6. The device of claim 5, wherein the processor is further configured to execute the computer-executable instructions to dispose a monetary reward or a credit to an account associated with the vehicle based on the vehicle's non-acceptance of travelling on the managed lane.

7. The device of claim 5, wherein at least one of (a) an amount of a payment from an account associated with the vehicle based on the vehicle's acceptance of travelling on the managed lane or (b) an amount of a monetary reward or a credit to the account based on the vehicle's non-acceptance of travelling on the managed lane is determined based on the traffic information.

8. The device of claim 7, wherein the amount of payment or the amount of the monetary reward or the credit is based on an amount of distance that the vehicle takes to switch to the managed lane.

9. A method, comprising:
  receiving traffic information associated with vehicles travelling on a portion of a multilane road;
  designating at least one lane of the multilane road as a managed lane based on the traffic information;
  transmitting, via a V2X communications protocol, a message to the vehicles, the message indicative of the designation of the lane as the managed lane; and
  receiving a confirmation message from a vehicle, the confirmation message indicative of the vehicle's acceptance of travelling on the managed lane.

10. The method of claim 9, wherein receiving the traffic information further comprises receiving request messages from the vehicles for the device to designate the lane of the multilane road as the managed lane, and the method further comprises:
  determining that a threshold number of the request messages are received; and
  designating the lane as the managed lane based on the received threshold number of request messages and the traffic information.

11. The method of claim 9, wherein the method further comprises receiving a payment from an account associated with the vehicle based on the vehicle's acceptance of travelling on the managed lane.

12. The method of claim 9, wherein the method further comprises:
  receiving a rejection message from a vehicle, the rejection message indicative of the vehicle's non-acceptance of travelling on the managed lane; and
  disposing a monetary reward or a credit to an account associated with the vehicle based on the vehicle's non-acceptance of travelling on the managed lane.

13. The method of claim 12, wherein at least one of (a) an amount of a payment from an account associated with the vehicle based on the vehicle's acceptance of travelling on the managed lane or (b) an amount of a monetary reward or a credit to the account based on the vehicle's non-acceptance of travelling on the managed lane is determined based on the traffic information.

14. The method of claim 13, wherein the amount of payment or the amount of the monetary reward or the credit is based on an amount of distance that the vehicle takes to switch to the managed lane.

15. A non-transitory computer-readable medium storing computer-executable instructions which, when executed by a processor, cause the processor to perform operations comprising:
  transmitting traffic information associated with a vehicle travelling on a portion of a multilane road;
  receiving, via a V2X communications protocol, a message to the vehicle, the message indicative of the designation of a lane of the multilane road as a managed lane;
  receiving, via a human machine interface (HMI), a user input indicative of an acceptance or rejection of travelling on the managed lane; and
  transmitting a confirmation message from the vehicle, the confirmation message indicative of the vehicle's acceptance or rejection.

16. The non-transitory computer-readable medium of claim 15, wherein the computer-executable instructions to cause to transmit a message further comprise computer-executable instructions to cause to transmit the messages using a vehicle-to-everything (V2X) communications protocol.

17. The non-transitory computer-readable medium of claim 15, wherein the confirmation message is indicative of the vehicle's acceptance and the method further comprises transmitting a payment from an account associated with the vehicle based on the vehicle's acceptance of travelling on the managed lane.

18. The non-transitory computer-readable medium of claim 15, wherein the confirmation message is indicative of the vehicle's acceptance and the method further comprises disposing a monetary reward or a credit to an account associated with the vehicle based on the vehicle's non-acceptance of travelling on the managed lane.

19. The non-transitory computer-readable medium of claim 18, wherein at least one of (a) an amount of a payment from an account associated with the vehicle based on the vehicle's acceptance of travelling on the managed lane or (b) an amount of a monetary reward or a credit to the account based on the vehicle's non-acceptance of travelling on the managed lane is determined based on the traffic information.

20. The non-transitory computer-readable medium of claim 19, wherein the amount of payment or the amount of the monetary reward or the credit is based on an amount of distance that the vehicle takes to switch to the managed lane.

* * * * *